US006252595B1

(12) United States Patent
Birmingham et al.

(10) Patent No.: US 6,252,595 B1
(45) Date of Patent: *Jun. 26, 2001

(54) METHOD AND APPARATUS FOR A MULTI-STATE WINDOW

(75) Inventors: Blair B. A. Birmingham, Toronto; Barry Wilks, Markham, both of (CA)

(73) Assignee: ATI Technologies Inc., Thornhill (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,755

(22) Filed: Jun. 28, 1999

Related U.S. Application Data

(63) Continuation-in-part of application No. 08/876,729, filed on Jun. 16, 1996.

(51) Int. Cl.[7] ............................... G06F 3/00; G06F 13/00
(52) U.S. Cl. ............................... 345/343; 345/346
(58) Field of Search ................................... 345/339, 340, 345/343, 344, 345, 346, 348, 113, 114, 435

(56) References Cited

U.S. PATENT DOCUMENTS

| | | | |
|---|---|---|---|
| 5,283,560 | * 2/1994 | Bartlett et al. | 345/113 |
| 5,463,728 | * 10/1995 | Blahut et al. | 345/344 |
| 5,577,188 | * 11/1996 | Zhu | 345/326 |
| 5,581,670 | * 12/1996 | Bier et al. | 345/326 |
| 5,603,053 | * 2/1997 | Gough et al. | 710/5 |
| 5,638,501 | * 6/1997 | Gough et al. | 345/435 |
| 5,651,107 | * 7/1997 | Frank et al. | 345/344 |
| 5,805,163 | * 9/1998 | Bagnas | 345/345 |
| 5,831,615 | * 11/1998 | Drews et al. | 345/344 |
| 5,892,511 | * 4/1999 | Gelsinger et al. | 345/340 |
| 5,896,131 | * 4/1999 | Alexander | 345/340 |
| 5,949,432 | * 9/1999 | Gough et al. | 345/435 |
| 5,999,191 | * 12/1999 | Frank et al. | 345/435 |
| 6,072,489 | * 6/2000 | Gough et al. | 345/345 |

* cited by examiner

Primary Examiner—Crescelle N. dela Torre

(57) ABSTRACT

A method and apparatus for a multi-state window is accomplished by presenting a multi-state window on a computer screen in various states. In a given state, or ghost state, the multi-state window for providing video and/or graphics is provided on screen in a translucent form. In the translucent form, a window overlapped by the multi-state window will be shown and remain in focus. When a user input is received in the overlapped portion, a multi-state window driver associated with the multi-state window will provide the input to the overlaid window, i.e., to its associated window driver or to the multi-state window driver depending upon the message type. If the user decides to activate the multi-state window, the multi-state window driver transforms the multi-state window from the translucent state to an in-focus state. When in the in-focus state, the user inputs are processed by the multi-state window driver and not provided to the overlaid window.

14 Claims, 6 Drawing Sheets

METHOD AND APPARATUS FOR A MULTI-STATE WINDOW

RELATED APPLICATIONS

This is a continuation-in-part of application Ser. No. 08/876,729 filed with the USPTO on Jun. 16, 1996, pending and having at least one inventor in common.

TECHNICAL FIELD OF THE INVENTION

This invention relates generally to graphic user interfaces and more particularly to a multi-state window.

BACKGROUND OF THE INVENTION

Graphical user interface objects ("GUI") are known to include mouse control cursors, touch screens, pull-down menus, tool bars, task bars, short-cut icons, icons, and windows. Each of these on-screen GUIs allow a user to manipulate a computer to achieve a desired result. A desired result may be repositioning of a window, icon, etc., creation of a word processing document, a database document, a graphics document, etc.

As more and more GUIs are created, or used, the effective screen size is reduced to accommodate the GUIs. Of the GUIs displayed, only the ones in the foreground are active (i.e., in focus). In other words, when a user provides a GUI input, it is processed by a GUI that is in focus and addressed in some manner such as point and click.

To increase the effective screen size, but maintain the number of GUIs needed to run a given application, many of the GUIs are visually overlapped. When overlapped, only the GUI in the foreground is in focus. If the user desires to use an overlaid GUI, the user must first select it. Such a selection is interpreted by the operating system of the computer to bring the selected GUI into focus. If the user needs to repeatedly switch between several overlapped GUIs, this can become somewhat frustrating.

A user's frustration level may increase, if he or she is not familiar with the functionality of GUIs and needs to select several of them just to find the desired function he or she wants executed. In such a GUI-driven environment, the user either has to reduce the effective screen size, such that all needed GUIs don't overlap and are directly accessible, or maintain the effective screen size but overlap the GUIs.

For television and video games, additional information may be presented by overlapping the primary subject matter of the television display or video game with a translucent icon. The translucent icon for television is used as a channel identifier and/or copyright notice. The translucent icon for video games may provide game progress information, game instructions, or other such information. In either application, the translucent icon presents information and is not an interactive icon that would allow a user to evoke a specific function.

Therefore, a need exists for a method and apparatus for providing multi-state windows that allows for the effective screen size to be maximized and allows windows (i.e., GUIs), to be directly accessible.

DETAILED DESCRIPTION OF THE DRAWINGS

Generally, the present invention provides a method and apparatus for a multi-state window. This may be accomplished by presenting the multi-state window on a computer screen in various states. In a given state, or ghost state, the multi-state window is provided on screen in a translucent form. In the translucent form, a window overlapped by the multi-state window will be shown and remain in focus. When a user input is received in the overlapped portion, a multi-state window driver associated with the multi-state window will provide the input to the overlaid window, i.e., to its associated window driver. If the user decides to activate the multi-state window, the multi-state window driver transforms the multi-state window from the translucent state to an in-focus state. When in the in-focus state, the user inputs are processed by the multi-state window driver and not provided to the overlaid window. With such a method and apparatus, the present invention allows for multiple windows to be overlapped with underlying windows still remaining in focus. By enabling overlaid windows to remain in focus, the effective screen size of a computer is maximized.

Figure 1:
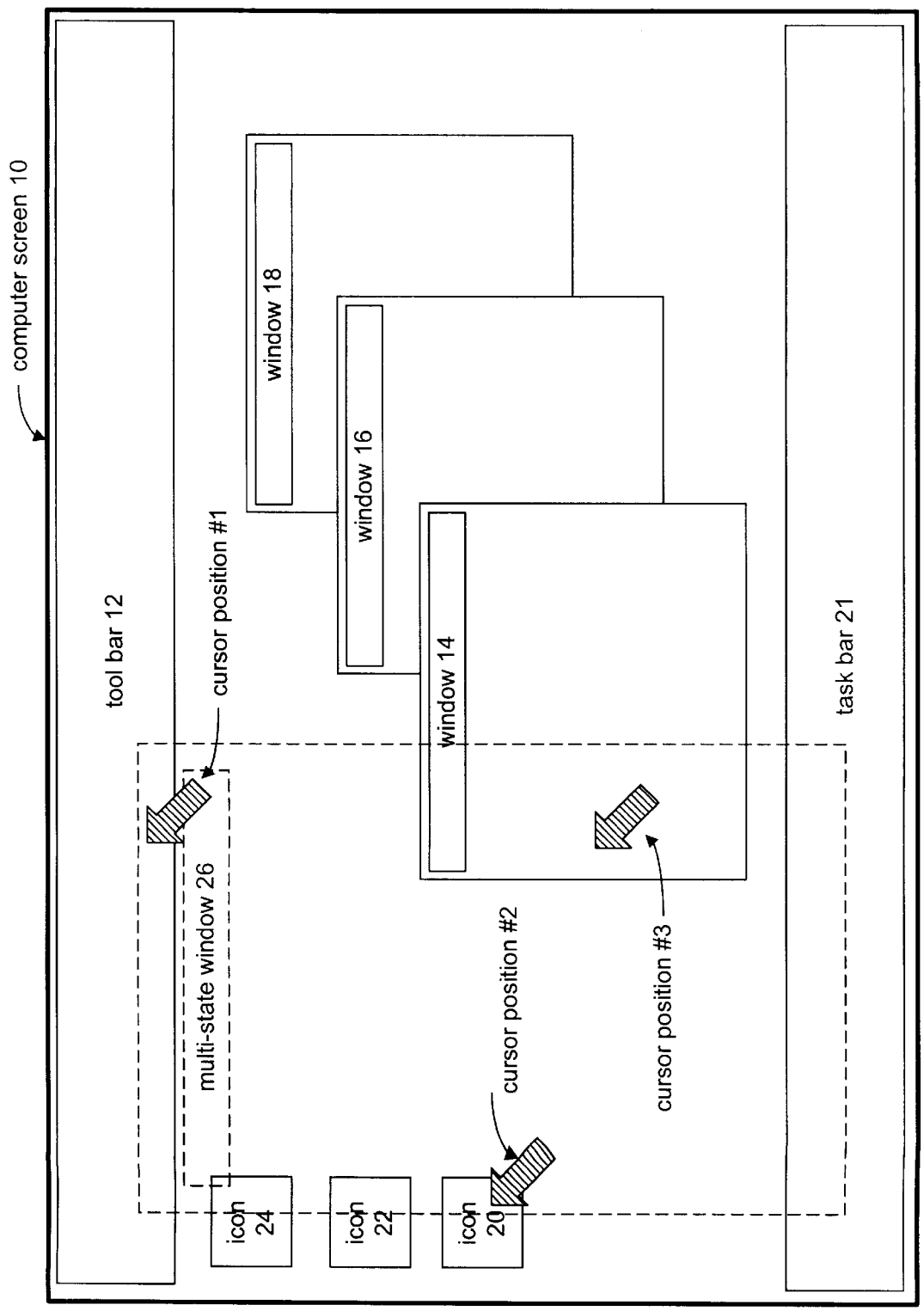
FIG. 1 illustrates a computer screen that includes a plurality of windows, or GUIs, and a multi-state window in accordance with the present invention.

The present invention can be more fully described with reference to FIGS. 1 through 6. FIG. 1 illustrates a computer screen 10 that is displaying a tool bar 12, a plurality of windows 14, 16 and 18, a task bar 21, a plurality of icons 20, 22 and 24, and a multi-state window 26. For the purposes of this discussion, the tool bar 12, the windows 14, 16 and 18, the task bar 21, and the icons 20, 22 and 24 may be generically referred to as windows, or graphical user interface objects.

The multi-state window 26 is shown in a translucent state. As such, the windows that the multi-state window 26 overlap are visible to the user. For example, the multi-state window 26 overlaps the tool bar 12, window 14, the task bar 21, and the three icons, 20, 22 and 24. When the user positions a cursor in an area covered by the multi-state window 26, the underlying window, which remains in focus, is being addressed. For example, if the user positions the cursor, as shown by cursor position #1, and provides an input message, the operating system of the computer will provide the message to a window driver associated with the multi-state window. A multi-state window driver, which is also associated with the multi-state window, will interpret the message and route it to a window driver associated with the tool bar 12, since tool bar 12 is in focus. Similarly, if the user positions the cursor as shown by cursor position #2, the message would be provided to the window driver associated with icon 20 such that the message could be processed accordingly. Still further, if the user positions the cursor as shown by cursor position #3, the input message would be provided to the window driver associated with window 14. The function of the window drivers will be discussed in greater detail with reference to FIGS. 3–6.

As one skilled in the art will readily appreciate, the computer screen 10 may include more or less windows than shown, and the size of the multi-state window 26 may be larger or smaller than shown. Such a skilled person will also appreciate that the multi-state window 26 may be applied over a running application, such as a database application, a word processing application, etc. Still further, several multi-state windows may be present on screen which may or may not overlap each other.

Figure 2:
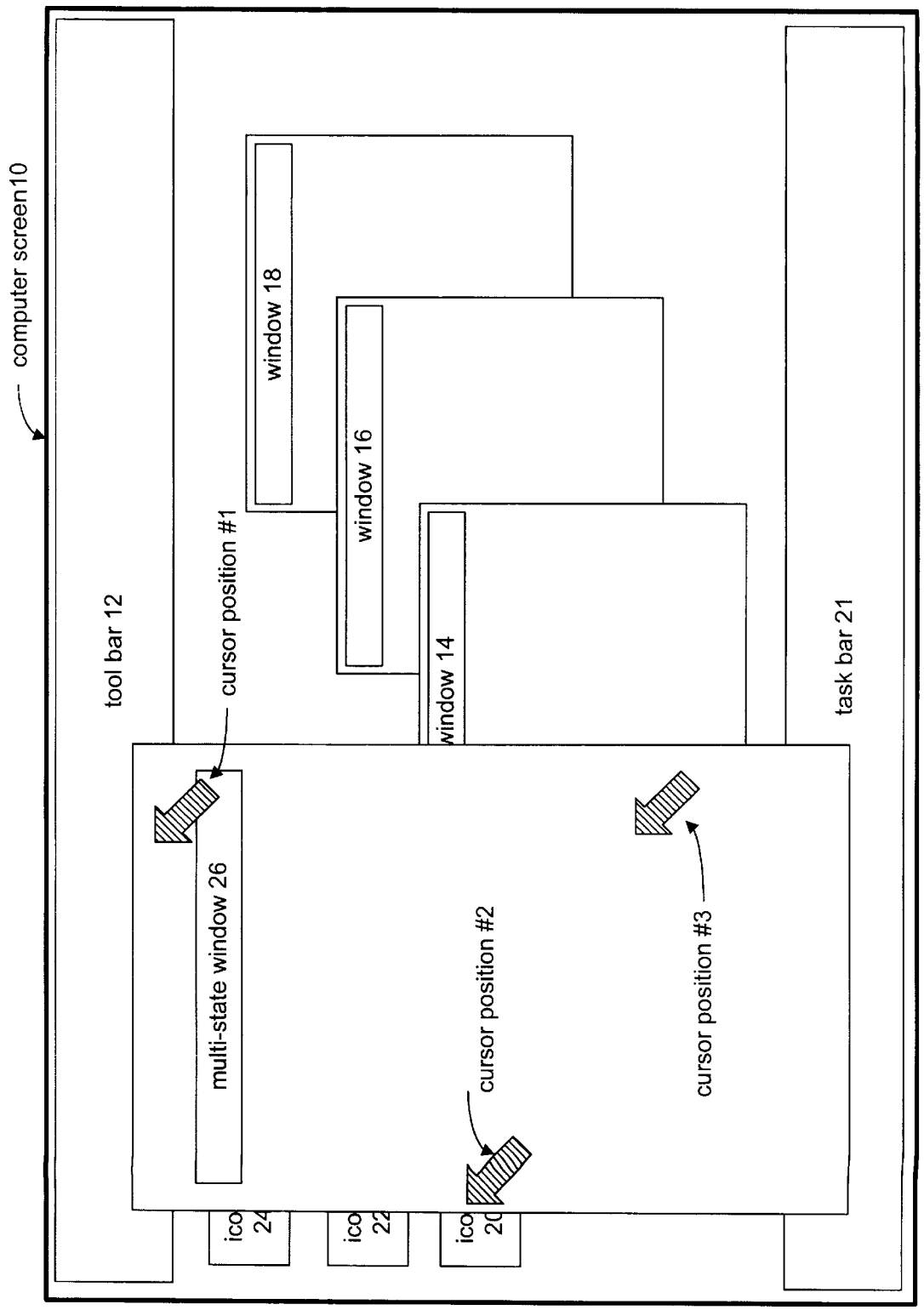
FIG. 2 illustrates the computer screen of FIG. 1 with an active multi-state window in accordance with the present invention.

FIG. 2 illustrates the computer screen 10 which includes the same elements as the computer screen 10 of FIG. 1. The difference between FIG. 1 and FIG. 2 is that the multistate window 26 is now in an active state. In the active state, the multi-state window 26 is in focus, thus, when the user positions the cursor in any one of cursor positions one, two or three, the input is provided to the multi-state window driver. Note that when the multi-state window 26 is brought into focus, it may change from a translucent state to an opaque state, may change color, may change translucency, and/or may be highlighted. When the user wishes to bring an underlying window back into focus, the user may simply point and click, or some other selection mechanism, the desired window.

Figure 3:
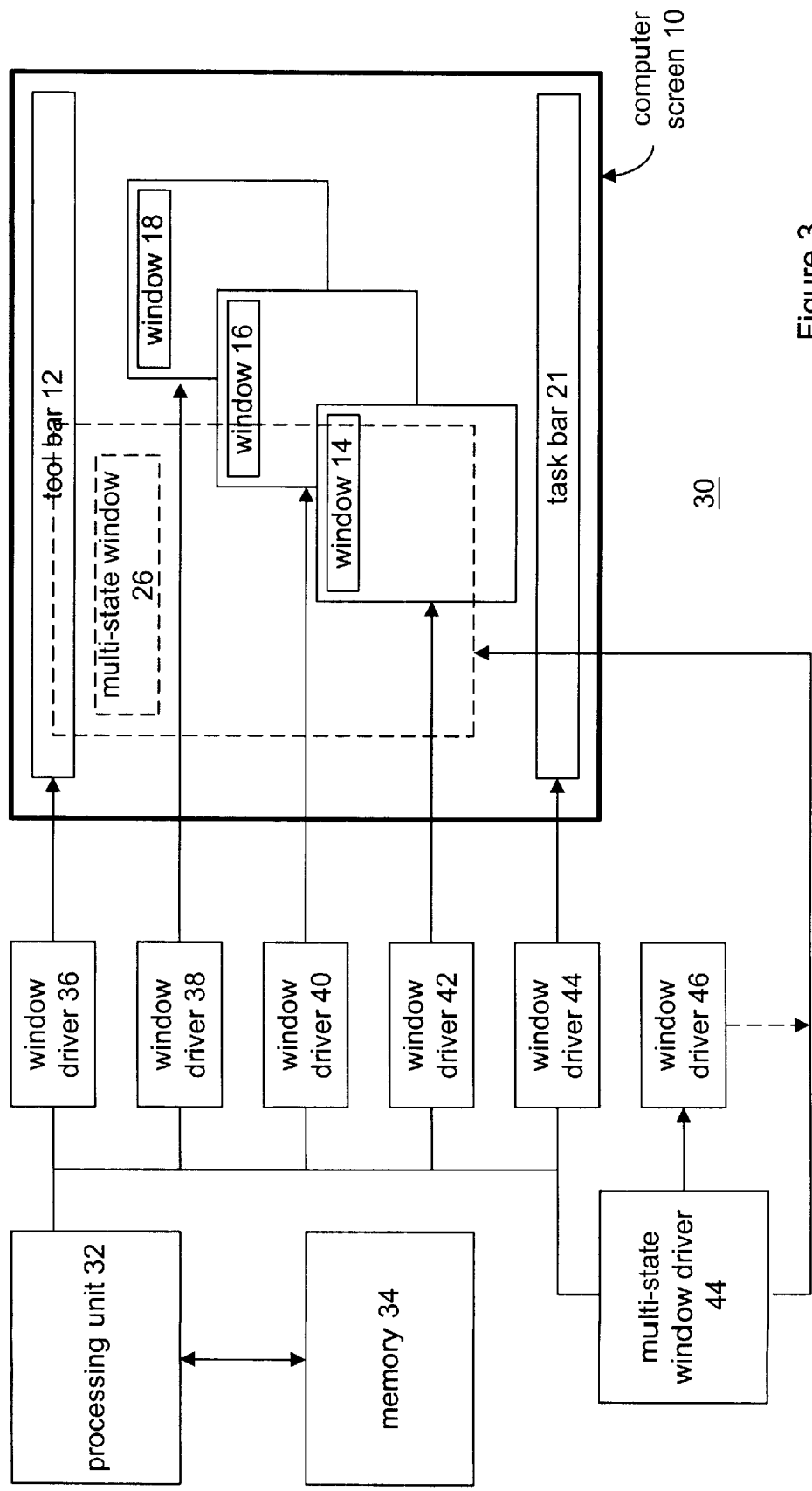
FIG. 3 illustrates a schematic block diagram of a system which is in accordance with the present invention.

FIG. 3 illustrates a system 30 that includes a processing unit 32, memory 34, a plurality of window drivers 36, 38, 40, 42, and 44, a multi-state window driver 44, an associated window driver 46, and a frame buffer which stores the data presented on the computer screen 10. The processing unit 32 may be a central processing unit of a computer, a microprocessor, a microcontroller, or a processing device used in a video graphics processor. The memory 34 may be RAM, ROM, cache memory, or any other means for storing digital information. The window drivers 36–44, the multi-state window driver 44, and the associated window driver 46 are firmware devices that have their software portions stored in memory 34 and the hardware portion being the processing units 36. Alternatively, the window drivers may be stand-alone processing devices that include associated memory for storing the programming instructions, which will be discussed in greater detail with reference to FIGS. 4–6.

As shown, each of the window drivers 36–44 provide the window drive functionality for an associated window shown in computer screen 10. For example, window driver 36 provides the window drive function for tool bar 12, window driver 38 for window 18; window driver 40 for window 16; window driver 42 for window 14; and window driver 44 for task bar 20. Thus, in operation, when any of these windows are in focus and not overlapped by the multi-state window, the operating system provides an input, which is received via some graphical user interface means, such as a mouse, touch screen, light pen, or key stroke, to the associated window driver. The associated window driver processes the input to provide the appropriate response, where an appropriate response may be to change the size of the particular window, change a color scheme, change data within the particular window, etc.

When an input is received in an area overlapped by the multi-state window, the operating system provides the input to the multi-state window driver 44. In practice, the operating system would need to be modified to include the ability to create a multi-state window driver such that it could directly address it. Alternatively, the multi-state window driver could be a separate driver that monitors commands addressed to the associated window driver 46 and intercepts them. In this alternative, the operating system would not need to be modified and, when an input was received in an area overlapped by the multi-state window, it would address the input to the associated window driver 46, which would be intercepted by the multi-state window driver 44.

Upon receiving the input message, the multi-state window driver 44 first determines the state of the multi-state window. If the multi-state window 26 in a translucent state, i.e., not in focus, the multi-state window driver 44 causes the input message to be routed to the window driver of the overlaid window that is in focus. As an example and referring to FIG. 1, assume the input message was originated due to cursor positioning #3, the multi-state window driver 44 causes the input message to be routed to window driver 42, which is associated with the overlaid window 14. The multi-state window driver 44 may cause the input message to be routed to the window driver of the overlaid window by sending the input message to operating system with the address changed to that of the window driver, such that the operating system will address the window driver. Alternatively, the multi-state window driver 44 could directly address the window driver of the overlaid window. In the alternative, the multi-state window driver 44 would need to be able to access the buses in the system to route the input message.

If, when the multi-state window driver 44 receives the input message, it determines that the multi-state window 26 is active, i.e., in focus, the multi-state window driver 44 provides the input message to the window driver 46. In this configuration, the window driver 46 acts like any of the other window drivers 36–44 to process the input message for the multi-state window 26. If, however, upon interpreting the input message, the multi-state window driver 44 determined that it was to change the state of the multi-state window, the multi-state window driver 44 would first determine the current state of the multi-state window. Having made this determination, the multi-state window 44 would provide instructions to the associated window driver 46 to change the appearance of the multi-state window. For example, the instructions could cause the multistate window to change from translucent to opaque (i.e., from not-in-focus to in-focus) or from opaque to translucent (i.e., from in-focus to not-in-focus). The transition from one state to the other may be done in multiple steps range from 2 to several hundred steps, linearly, etc.

Figure 4:
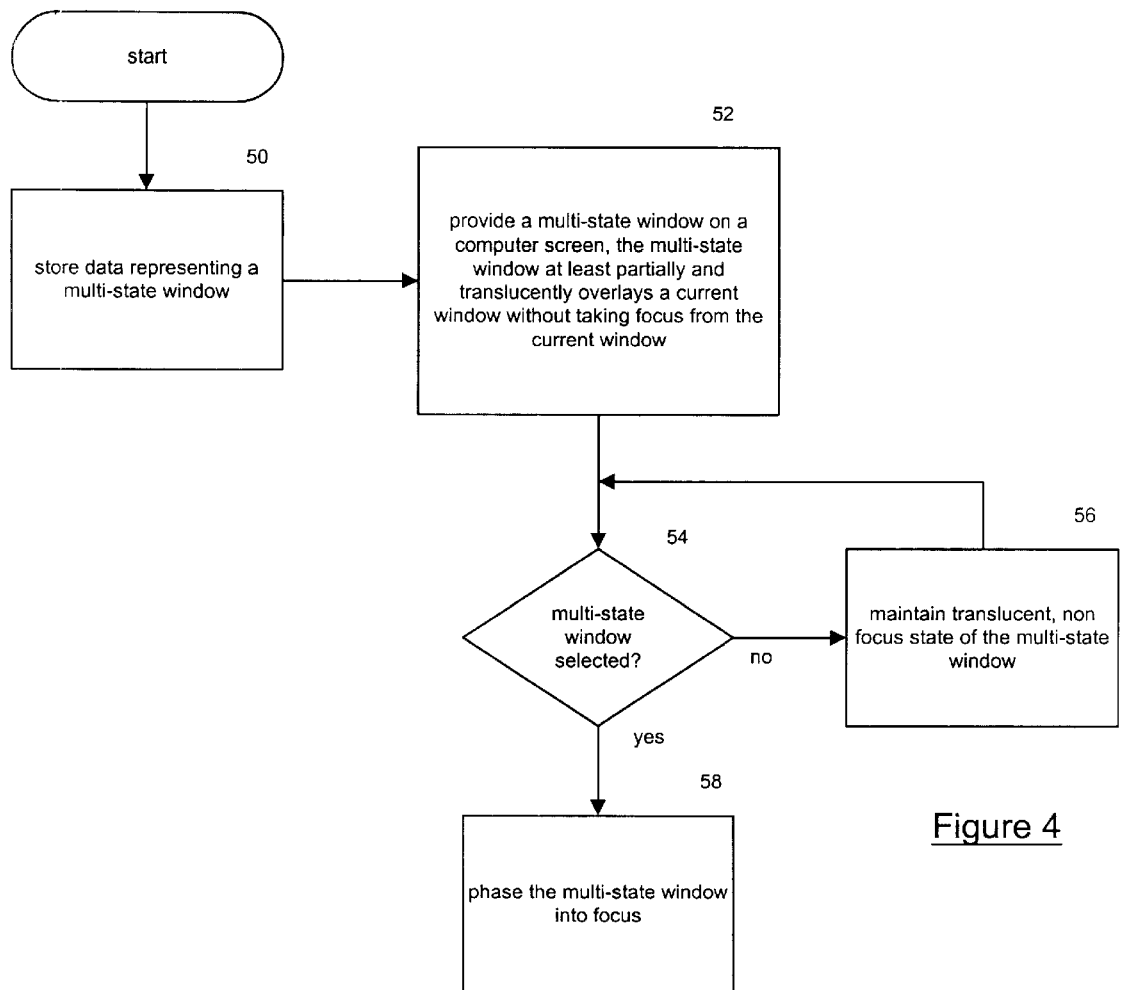
FIG. 4 illustrates a logic diagram that may be used to implement a multi-state window in accordance with the present invention.

FIG. 4 illustrates a logic diagram that may be used to implement a multi-state window in accordance with the present invention. The process begins at step 50 where data representing a multi-state window is stored. Such data would indicate the level of translucency of the multi-state window, the level of states in which the translucent window may appear (for example, the multi-state window may be almost transparent to slightly translucent). The data also stored would be programming instructions to implement the multi-state window. Such programming instructions are reflected in this FIG. 4, as well in FIGS. 5 and 6.

Having stored the data representing a multi-state window, the process proceeds to step 52 where a multi-state window is provided on a computer screen. The multi-state window at least partially and translucently overlays a current window without taking focus from the current window. As such, when a graphical interface is provided in an area covered by the multi-state window, the graphical interface is provided to the current window. In this manner, the graphical interface message effects the portion of the current window overlaid by the multi-state window. Such affecting of the portion of the current window may be a visual feedback, for example, highlighting, changing colors, etc., or a data change. The data change may be changing the shape of the window, color of the window, or data content of the particular window. For example, if the current window is a word processing application, particular data may be changed.

Having provided the multi-state window in a translucent state, the process proceeds to step 54. At step 54, a determination is made as to whether the multi-state window has been selected. Such a selection would indicate that the multi-state window is to become in focus. The selection may be done by detecting a mouse cursor positioning over the multi-state window for a predetermined period of time. For example, two seconds to ten seconds, selection of a particular icon, a particular key combination via the keyboard, a touch-screen activation, or a menu selection. If the multi-state window has not been selected, the process proceeds to step 56 where the multi-state window is maintained in the translucent, non-focused state.

If, however, the multi-state window has been selected to come in focus, the process proceeds to step 58. At step 58, the multi-state window is phased into focus. Such phasing into focus may be a multi-step transition from translucent to opaque where the number of steps range from 2 to any given number, a linear transition from translucent to opaque, providing an audible indicator and/or a visual indicator. As one skilled in the art will readily appreciate, there is a plurality of ways in which the multi-state window may be phased into focus.

Once the multi-state window is in focus, graphical interface messages received within the physical proximity of the multi-state window are processed by the multi-state window driver and the associated window driver. When the user desires to deselect the multi-state window, i.e., returning it to a translucent state, the user may reselect the current window such that the current window becomes in focus thereby causing the multi-state window to return to the translucent, non-focused, state.

Figure 5:
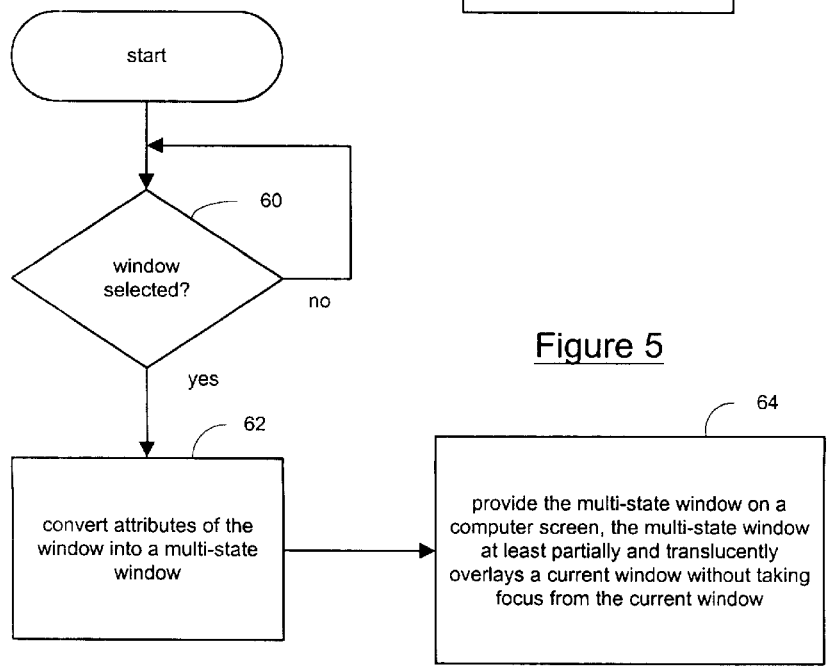
FIG. 5 illustrates a logic diagram that may be used to select a given window to function as a multi-state window in accordance with the present invention.

FIG. 5 illustrates a logic diagram that may be evoked to allow any window to become a multi-state window. The process begins at step 60 where a determination is made as to whether a particular window has been selected. Once the window has been selected, the process proceeds to step 62. At step 62, the attributes of the particular window are converted into a multi-state window. This may be done by subclassing the particular window driver (the window driver 46 of FIG. 3), and receiving window commands for the selected window by a multi-state window driver (the multi-state window driver 44 of FIG. 3).

Having converted the attributes of the window into multi-state window attributes, the process proceeds to step 64. At step 64, the multi-state window is provided on a computer screen. The multi-state window may at least partially and translucently overlay a current window without taking focus from the current window. Such was described with reference to FIG. 1. While the selected window remains a multi-state window, it functions as described herein. When the user desires to deselect the window from being a multi-state window, the user evokes an appropriate input command, which may be selection of an icon, a menu selection, etc.

Figure 6:
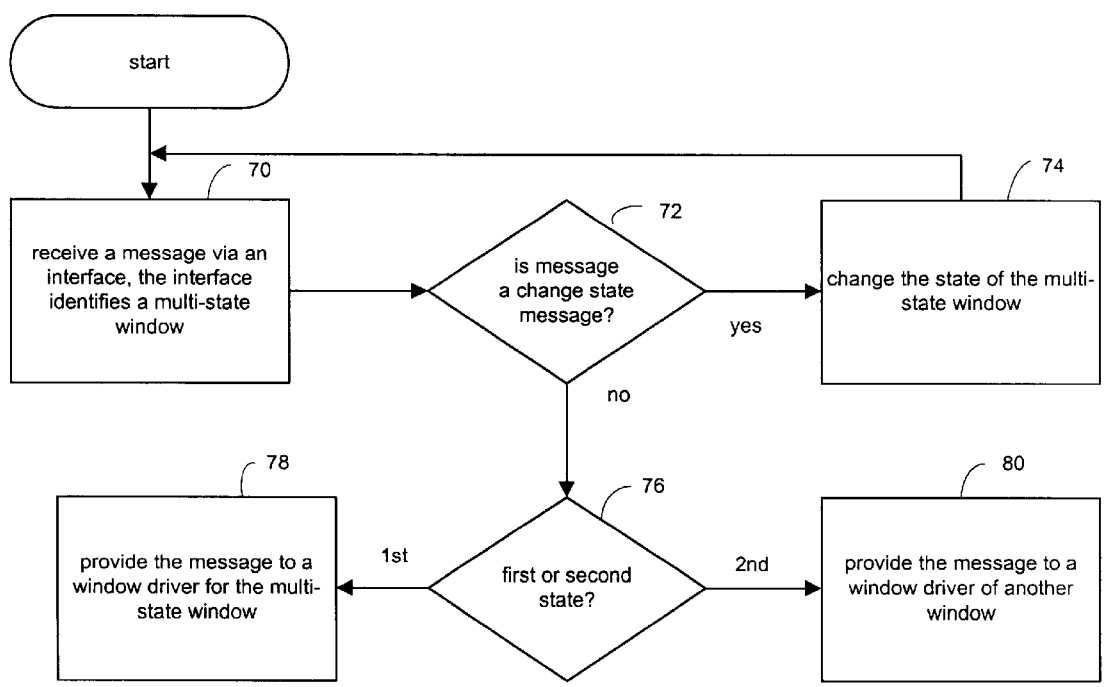
FIG. 6 illustrates a logic diagram that may be used to process messages for a multi-state window in accordance with the present invention.

FIG. 6 illustrates a logic diagram that may be used by the multi-state window driver to process messages. The process begins at step 70 where a message is received via an interface. Such an interface may be a graphical user interface as previously described or a keyboard entry. The interface identifies the particular multi-state window. In other words, if it is a graphical user interface, the mouse cursor has been positioned over the multi-state window.

Having received the message, the process proceeds to step 72 where a determination is made as to whether the message is a changed state message. If so, the process proceeds to step 74 where the state of the multi-state window is changed. For example, if the multi-state window were in a first state, i.e., in focus, the multi-state window would change to the translucent, non-focused, state or a second state. Conversely, if the multi-state window were in the second state, it would change to the first state. To determine the state of the multi-state window, the multi-state window driver accesses a window style bit that, when set indicates the second state and when not set indicates the first state.

If the message is not a changed state message, the process proceeds to step 76 where a determination is made as to whether the multi-state window is in a first or second state. If the multi-state window is in a first state, the process proceeds to step 78. At step 78, the message is provided to the window driver for the multi-state window. As such, the multi-state window processes the particular message. If, however, the multi-state window is in the second state, the non-focused state, the message is provided to a window driver of another window. The other window is overlapped by the multi-state window.

In addition, the multi-state window driver may process a draw message. If the message is a draw message, which requests the multi-state window to be drawn, the state of the multi-state window is determined. Having made this determination, the multi-state window is drawn as an opaque window when in the first state, and is drawn as a translucent, non-focused, window when in the second state.

Figure 7:
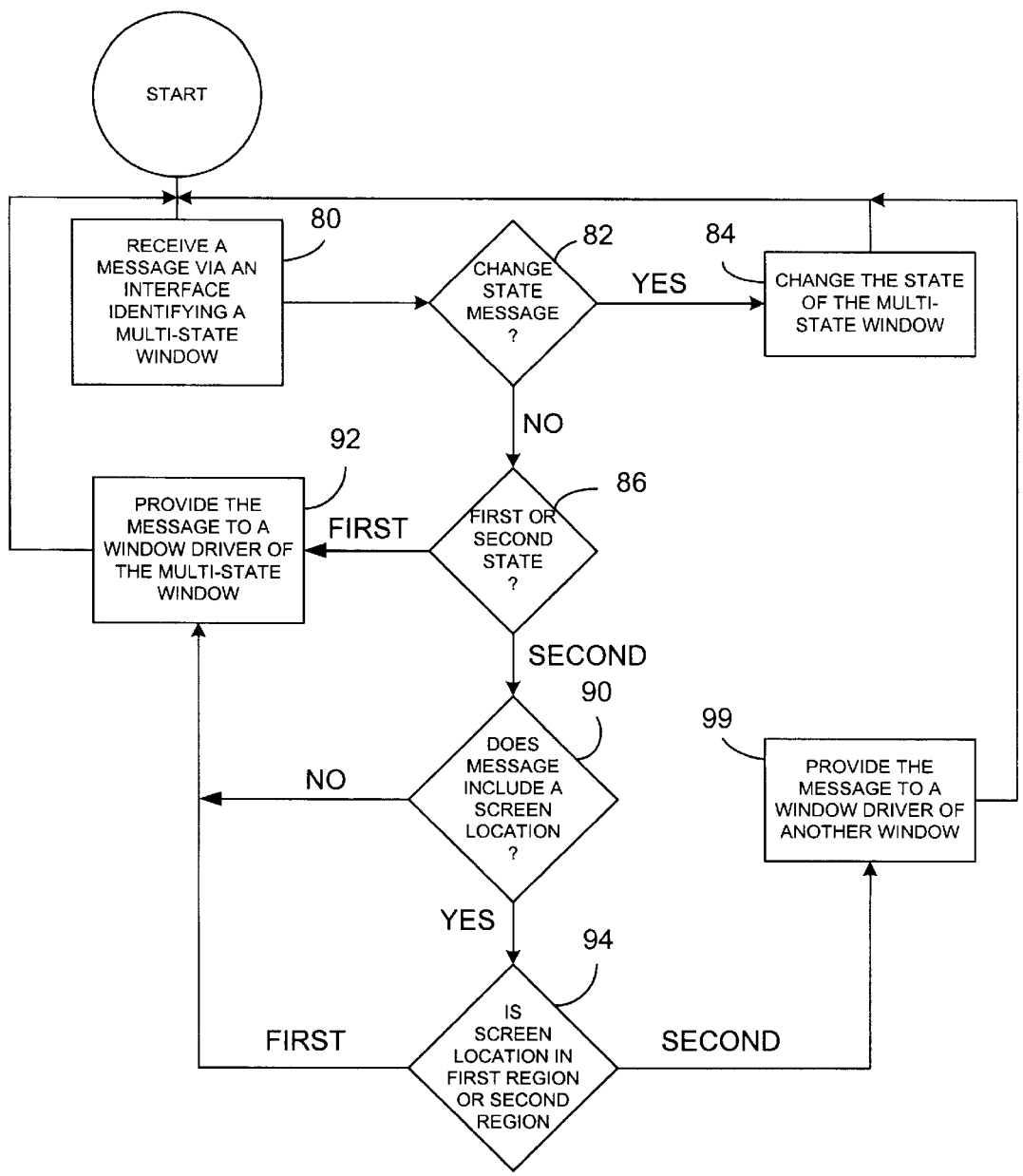
FIG. 7 illustrates a flow diagram that may be used to process messages for a multi-state window in accordance with the present invention.

FIG. 7 illustrates a method representing another embodiment of the present invention. The method of FIG. 7 begins at step 80 where a message is received via an interface. Such an interface may be a graphical user interface as previously described or a keyboard entry. The interface identifies the particular multi-state window. In other words, if it is a graphical user interface, the mouse cursor has been positioned over the multi-state window. Generally, the cursor location will also be provided as part of this message Having received the message, the process proceeds to step 82 where a determination is made as to whether the message is a change state message. If so, the process proceeds to step 84 where the state of the multi-state window is changed. For example, if the multi-state window were in a first state, i.e., in focus, the multi-state window would change to the translucent, non-focused, state or a second state. Conversely, if the multi-state window were in the second state, it would change to the first state. To determine the state of the multi-state window, the multi-state window driver accesses a window style bit that, when set indicates the second state and when not set indicates the first state. A third state would be a variation of the multi-state window state, whereby the multi-state window driver would recognize only certain regions of the multi-state window as needing to be processed by the window driver of the multi-state window, allowing other regions to be processed by a different window.

If the message is not a changed state message, the process proceeds to step 86 where a determination is made as to whether the multi-state window is in a first or second state. If the multi-state window is in a second state, the non-focused state the process proceeds to step 90, whereby the message is further evaluated. If, however, the multi-state window is in the first state, the in-focus state, the message is provided to the window driver of the multi-state window at step 88 where the message is processed. The other window is overlapped by the multi-state window. Additional modes will represented by additional storage bits.

When the message is in the second state, the method proceeds to step 90, where a determination is made as to whether a screen, or cursor, location is included with the message. If not, flow proceeds to step 92, where the message is provided to a window driver associated with the other window. If a screen location is included with the message, the flow proceeds to step 94.

At step 94, a determination is made whether the screen location is in a first region or a second region. When the screen location is in a first region, the method proceeds to step 92, where the message is processed by the window driver associated with the multi-state window. Otherwise the message is provided to the other window driver at step 88.

In a specific embodiment, the multi-state window driver 44 of FIG. 3 is associated with the multi-state window 26 which is for displaying video. The window 26 has various buttons and controls (not shown) for controlling the video being displayed. For example, a button could be used to mute the sound, change the channel of a tuner, or any other video type function. A region corresponding to a buttonis included with a mesage when the button is clicked while the video window is in a transparent state, or mode. As a result, the message is provided to step 94, where it is determined whether a selected screen location is the first region (the button region). If so, that the message will be processed by the window driver associated with the multi-state windowat step 92 because this is the driver that controls the button's functionality. If a selected window is outside a region associated with the multistate window, the message will be provided to the window driver associed with the other window at step 88.

Flow proceeds from steps 84, 88 and 92 back to step 80.

The proceeding discussion has provided a method and apparatus for providing a multi-state window on a computer screen. Such a multi-state window allows for additional windows to be displayed without taking focus away from underlying windows. As such, computer users may increase the effective screen size while maintaining access to a plurality of windows.

We claim:

1. A method comprising the steps of:
   receiving a message via an interface, wherein the message identifies a multi-state window;
   determining whether the message is a request to change state of the multi-state window;
   when the message is not a request to change the state of the multi-state window, determining the state of the multi-state window;
   when the multi-state window is in a first state, and a cursor location is in a first region of the multi-state window, providing the message to a window driver for the multi-state window;
   when the multi-state window is in a second state,
      providing the message to the window driver for another window when the cursor location is in a second region of the multi-state window, and
      providing the message to the window driver for the multi-state window when the cursor is in the first region of the multi-state window,
      wherein the second region at least partially overlies another window.

2. The method of claim 1, wherein the multi-state window is for displaying video.

3. The method of claim 1, wherein the first region is a control location associated with the multi-state window.

4. The method of claim 3, wherein the control location is a graphical user interface.

5. The method of claim 4, wherein the graphical user interface is for controlling video to be displayed in the multi-state window.

6. The method of claim 3, wherein the control location overlies the another window.

7. The method of claim 1, wherein the message includes the cursor location.

8. A digital storage medium that stores programming instructions that perform the following operations:
   receiving a message via an interface, wherein the message identifies a multi-state window;
   determining whether the message is a request to change state of the multi-state window;
   when the message is not a request to change the state of the multi-state window, determining a state of the multi-state window;
   when the multi-state window is in a first state, and a cursor location is in a first region of the multi-state window, providing the message to a window driver for the multi-state window;
   when the multi-state window is in a second state,
      providing the message to the window driver for another window when the cursor location is in a second region of the multi-state window, and
      providing the message to the window driver for the multi-state window when the cursor is in the first region of the multi-state window,
      wherein the second region at least partially overlay another window.

9. A computer system comprising:
   a central processing unit;
   a memory coupled to the central processing unit;
   video graphics processor coupled to the central processing unit;
   a video graphics processor coupled to the central processing unit;
   wherein the system includes commands for:
      receiving a message via an interface, wherein the message identifies a multi-state window;
      determining whether the message is a request to change state of the multi-state window;
      when the message is not a request to change the state of the multi-state window, determining a state of the multi-state window;
      when the multi-state window is in a first state, and a cursor location is in a first region of the multi-state window, providing the message to a window driver for the multi-state window;
      when the multi-state window is in a second state,
         providing the message to the window driver for another window when the cursor location is in a second region of the multi-state window, and
         providing the message to the window driver for the multi-state window when the cursor is in the first region of the multi-state window,
         wherein the second region at least partially overlies another window.

10. A method comprising the steps of:
   receiving a message via an interface, wherein the message identifies a first window and a cursor location associated with the first window;
   determining whether the cursor location is in a first region or a second region of the first window;
   when the message is in the first region:
      processing the message by a first window driver associated with the first window;
   when the message is in the second region:
      providing the message to a second window driver for processing, wherein the second window driver is different than the first window driver.

11. The method of claim 10, wherein the step of determining is performed by the first window driver.

12. The method of claim 10, wherein the second window driver is associated with a second window.

13. The method of claim 12, wherein the first region and the second region of the first window translucently overlay at least a portion of the second window.

14. The method of claim 10, wherein the first window is for displaying video data.

* * * * *